United States Patent [19]
Pierce et al.

[11] Patent Number: 5,552,691
[45] Date of Patent: Sep. 3, 1996

[54] MICROPROCESSOR MOTOR CONTROL

[75] Inventors: Perry A. Pierce, Darien; Peter K. Zanger, Naugatuck, both of Conn.

[73] Assignee: Pitney Bowes Inc., Stamford, Conn.

[21] Appl. No.: 338,727

[22] Filed: Nov. 14, 1994

[51] Int. Cl.⁶ .............................. G05B 19/42; B65G 43/00
[52] U.S. Cl. .................... 318/652; 318/573; 318/568.11; 318/603; 198/718
[58] Field of Search ............................... 318/30–80, 138, 318/139, 245, 254, 560–646; 388/800–890; 364/519, 469, 164; 242/336; 198/718

[56] References Cited

U.S. PATENT DOCUMENTS

| | | | |
|---|---|---|---|
| Re. 33,500 | 12/1990 | Bisseling | 388/809 |
| 4,282,468 | 8/1981 | Barker et al. | 318/608 |
| 4,426,608 | 1/1984 | Larson et al. | 318/685 |
| 4,429,267 | 1/1984 | Veale | 318/594 |
| 4,438,376 | 3/1984 | Varnovitsky | 318/78 |
| 4,463,300 | 7/1984 | Mayne et al. | 318/687 |
| 4,469,993 | 9/1984 | Swanson et al. | 318/561 |
| 4,520,300 | 5/1985 | Fradella | 318/603 |
| 4,533,991 | 8/1985 | Georgis | 364/164 |
| 4,580,084 | 4/1986 | Takahashi et al. | 318/396 |
| 4,719,575 | 1/1988 | Gnuechtel | 364/469 |
| 4,733,144 | 3/1988 | Bisseling | 318/318 |
| 4,775,945 | 10/1988 | Cavill et al. | 364/519 |
| 4,777,609 | 10/1988 | Cavill et al. | 364/519 |
| 4,845,608 | 7/1989 | Gdula | 388/810 |
| 5,254,919 | 10/1993 | Bridges et al. | 318/560 |
| 5,373,221 | 12/1994 | McGee et al. | 318/568.11 |
| 5,413,212 | 5/1995 | Bodie | 198/718 |
| 5,419,506 | 5/1995 | Gunday et al. | 242/336 |
| 5,434,489 | 7/1995 | Cheng et al. | 318/568.15 |

*Primary Examiner*—Paul Ip
*Attorney, Agent, or Firm*—Charles R. Malandra, Jr.; David E. Pitchenik; Melvin J. Scolnick

[57] ABSTRACT

A method for providing motion information for a motor controller is accomplished by defining a determined set of motion parameters for describing a desired motion in terms of encoder position data. The parameters are stored for use in calculating the desired motion profile of the motor during the various motion segments of the desired profile as the motor is being driven. The method saves on required memory storage for all the various motor profiles typically used in devices such as inserters since only the parameters used in calculating must be stored. A flag field is also provided to enable the microprocessor to determine which of the segments is being generated.

6 Claims, 20 Drawing Sheets

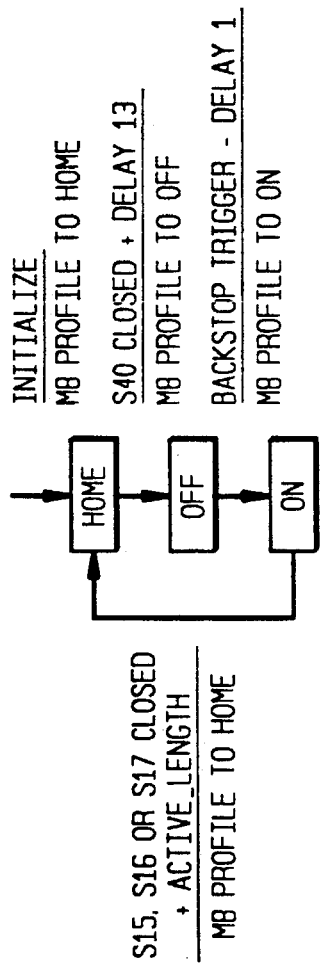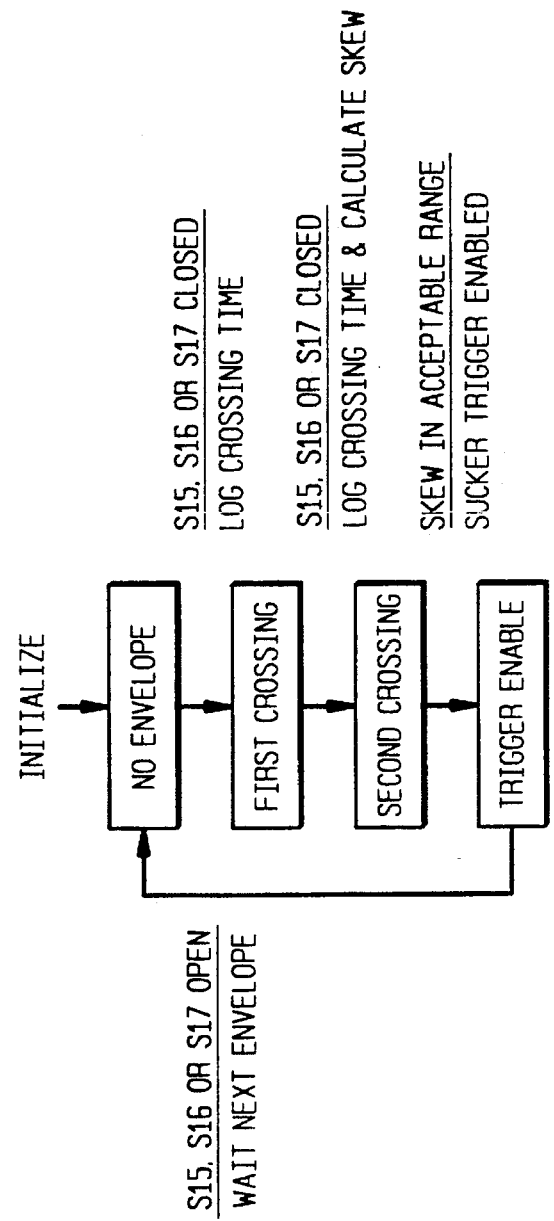

FIG. 13

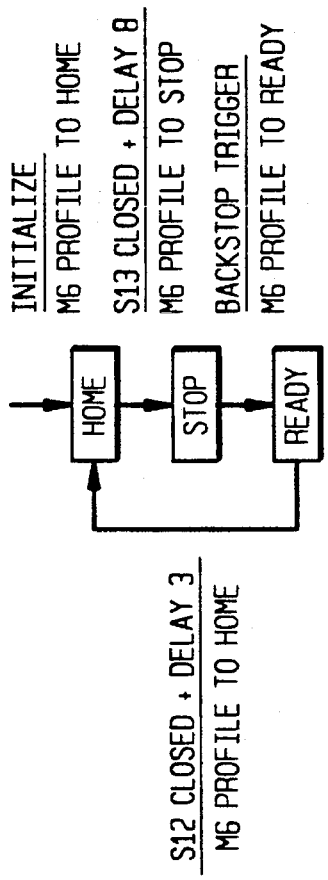

INITIALIZE
M6 PROFILE TO HOME

S13 CLOSED + DELAY 8
M6 PROFILE TO STOP

BACKSTOP TRIGGER
M6 PROFILE TO READY

S12 CLOSED + DELAY 3
M6 PROFILE TO HOME

BACKSTOP TRIGGER = PUSHER AT CREASE LINE(#CNTS E2)+DELAY 2    DELAY 2 = #CNTS ON E2
DELAY 3 = [[(env_length-3)+flap_length](in)/v(in/sec)]-[BACKSTOP ACTUATION TIME](sec)
DEFAULT ACTUATION TIME = 20 msec
DELAY 8 = #CNTS ON E6 TO VARY THE START OF THE DECELERATE PROFILE TO READY AROUND THE HOME SENSOR S13

FIG. 15

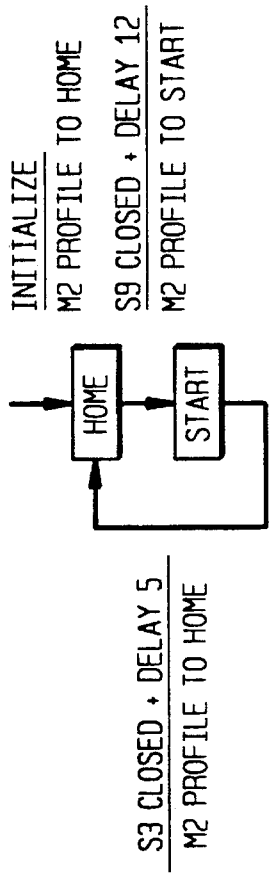

INITIALIZE
M2 PROFILE TO HOME

S9 CLOSED + DELAY 12
M2 PROFILE TO START

S3 CLOSED + DELAY 5
M2 PROFILE TO HOME

DELAY 5 = #CNTS ON E1 USED TO VARY THE START OF THE PUSHER PROFILE AROUND THE ENCLOSURE ARRIVAL

DELAY 12 = #CNTS ON E2 TO VARY THE TRIGGER OF THE DECELERATE PROFILE TO START AROUND THE HOME SENSOR S9

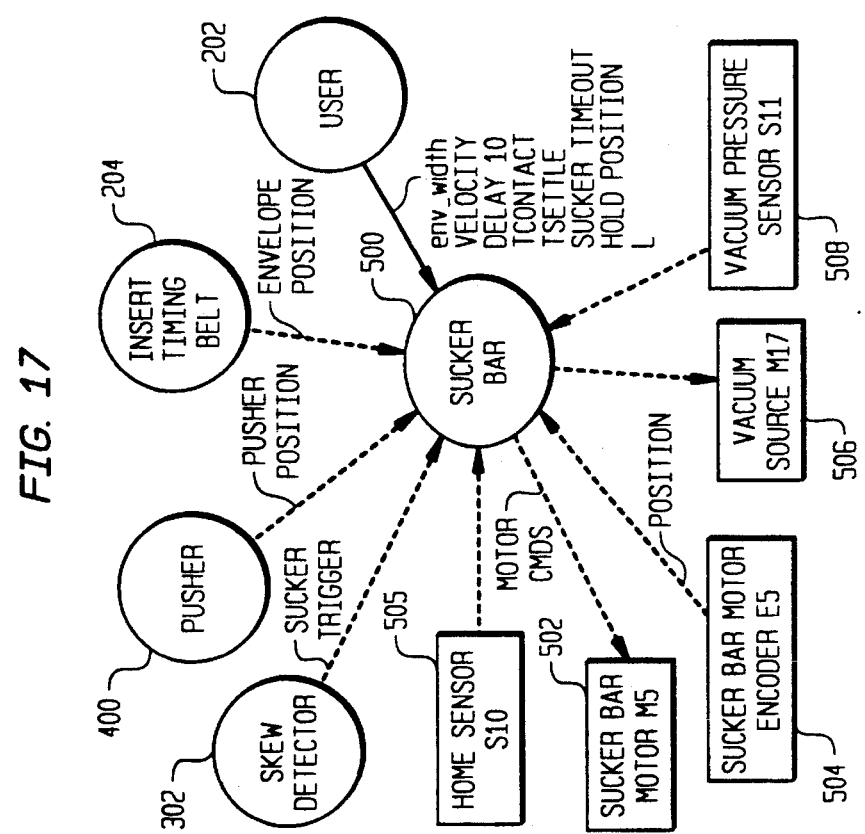

FIG. 22

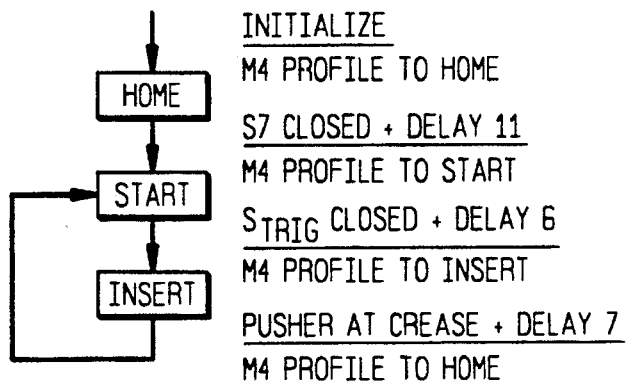

INITIALIZE
M4 PROFILE TO HOME

S7 CLOSED + DELAY 11
M4 PROFILE TO START $S_{TRIG}$ CLOSED + DELAY 6
M4 PROFILE TO INSERT

PUSHER AT CREASE + DELAY 7
M4 PROFILE TO HOME

DELAY 6 = #CNTS ON E5. USED TO VARY THE TRIGGER OF THE HORN PROFILE TO THE INSERT POSTION IN RELATION TO THE SUCKER BAR PROFILE. (AROUND ENV CONTACT)

DELAY 7 = #CNTS IN E2. USED TO VARY THE TRIGGER OF THE HORN PROFILE BACK TO THE START POSITION.

DELAY 11 = #CNTS ON E4 TO VARY THE TRIGGER OF THE ACCELERATE PROFILE TO THE START POSITION AROUND THE HOME SENSOR S7

START POSITION = #CNTS ON E4 EQUIVALENT TO THE STARTING ANGLE OF THE HORN STROKE

FIG. 23

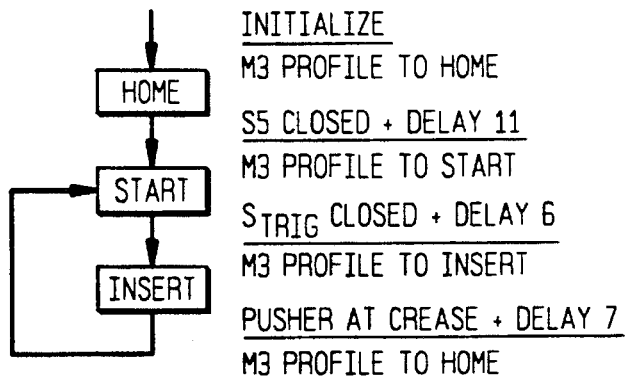

INITIALIZE
M3 PROFILE TO HOME

S5 CLOSED + DELAY 11
M3 PROFILE TO START $S_{TRIG}$ CLOSED + DELAY 6
M3 PROFILE TO INSERT

PUSHER AT CREASE + DELAY 7
M3 PROFILE TO HOME

DELAY 6 = #CNTS ON E5. USED TO VARY THE TRIGGER OF THE HORN PROFILE TO THE INSERT POSTION IN RELATION TO THE SUCKER BAR PROFILE. (AROUND ENV CONTACT)

DELAY 7 = #CNTS IN E2. USED TO VARY THE TRIGGER OF THE HORN PROFILE BACK TO THE START POSITION.

DELAY 11 = #CNTS ON E4 TO VARY THE TRIGGER OF THE ACCELERATE PROFILE TO THE START POSITION AROUND THE HOME SENSOR S5

START POSITION = #CNTS ON E3 EQUIVALENT TO THE STARTING ANGLE OF THE HORN STROKE

1. ENVELOPE ARRIVES AT NIP AT T=185 ms.
2. COLLATION 2ND TE CROSSING OCCURS AT T=149.2 ms.
3. ENVELOPE IS 4-1/8 INCHES IN LENGTH WITH A 1-5/8 INCH FLAP LENGTH.
4. NO SLIPPAGE OF PAPER OCCURS.
5. HOMING SENSORS ARE IN RANDOM PLACES.
6. DURING INITIALIZATION, ENVELOPE ARRIVES AT ARMING NIP 130 MS AFTER INITIALIZTION COMMAND.
7. BACKSTOP STEP TAKES 20 ms.

MICROPROCESSOR MOTOR CONTROL

FIELD OF THE INVENTION

The invention relates to systems control apparatus and more particularly to a method for describing motion for use with microprocessor-controlled motors.

BACKGROUND OF THE INVENTION

Many methods for microprocessor control of motors and more particularly for motors for use with insertion devices have been developed. While many of these methods can work quite well, these known solutions require large amounts of both read-only-memory (ROM) space and random-access-memory (RAM) space in order to load the resulting motor profiles.

U.S. Pat. No. 3,709,482 to Nelson, et. al. describes a high speed document feeder using synchronous operation. U.S. Pat. No. 3,825,251 discloses a system for controlling the feed of documents into and along a document path.

U.S. Pat. No. 5,003,485 describes an asynchronous communication protocol for a collating and insertion device. U.S. Pat. No. 5,02,073 describes a card and mailer data inserter system. None of the foregoing teach a method for describing required motor profiles in an economical way for saving space in the memories of the microprocessor controller.

SUMMARY OF THE INVENTION

It is therefore an object of the invention to provide an improved method for storing motor profiles with an economical use of limited memory.

It is a further object of the invention to provide a method for generally describing motion which is useful for event-driven control of the motors of an insertion device.

The above and other objects are attained in a method for providing motion information for a motor controller for a motor having an encoder for providing motor feedback data, the method comprising the steps of defining a determined set of motion parameters for describing a desired motion in terms of encoder position data, storing the parameters generated in accordance with the defining process, calculating motor drive information using the parameters and the encoder data for control of said motor during operation of the motor, and driving said motor in accordance with the calculated information.

The method saves on required memory storage for all the various motor profiles typically used in devices such as inserters since only the parameters used in calculating must be stored. A flag field is also provided to enable the microprocessor to determine which of the segments is being generated.

BRIEF DESCRIPTION OF THE DRAWING

FIG. 9 is an illustrative flow chart of the operation of the module of FIG. 8.

FIG. 11 is a flow chart of the operation of the skew detector module.

FIG. 13 is a flow chart of the operation of the module of FIG. 12.

FIG. 15 is a flow chart of the operation of the module of FIG. 14.

FIG. 17 illustrates the sucker bar software program module.

FIG. 18 is a flow chart of the operation of sucker bar program module.

FIGS. 22 and 23 are the respective flow charts for the modules of FIGS. 21 and 22 for controlling the operation of the right and left horns.

DESCRIPTION OF THE PREFERRED EMBODIMENT

In FIGS. 1 through 4 there is shown generally at 10 an inserter device in which a motion profile calculation in accordance with the invention may be incorporated. In the apparatus illustrated, the inserting station 10 includes an envelope arming or staging area shown at 20 which comprises angled guide plates 24 and a series of laterally spaced roller pairs 23 and 23 for receiving individual envelopes from a conventional transport system (not shown). Conveniently, roller 23 is driven by a servo motor via a conventional timing pulley and belt (also not shown).

Figure 3:
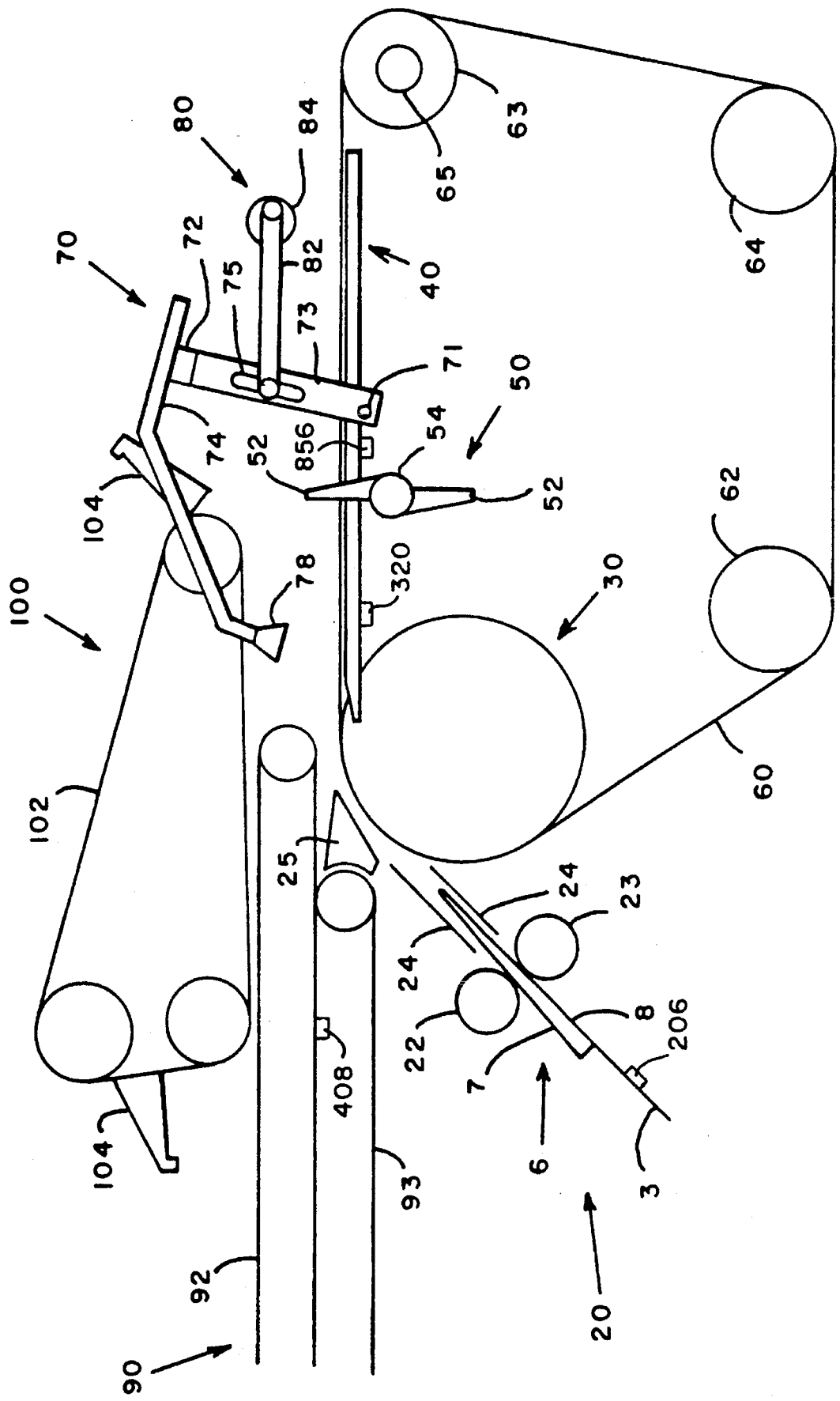
FIG. 3 is a schematic side elevation view of the inserting apparatus of FIG. 1 showing details of the sucker bar assembly and with an envelope at the arming station.
Figure 4:
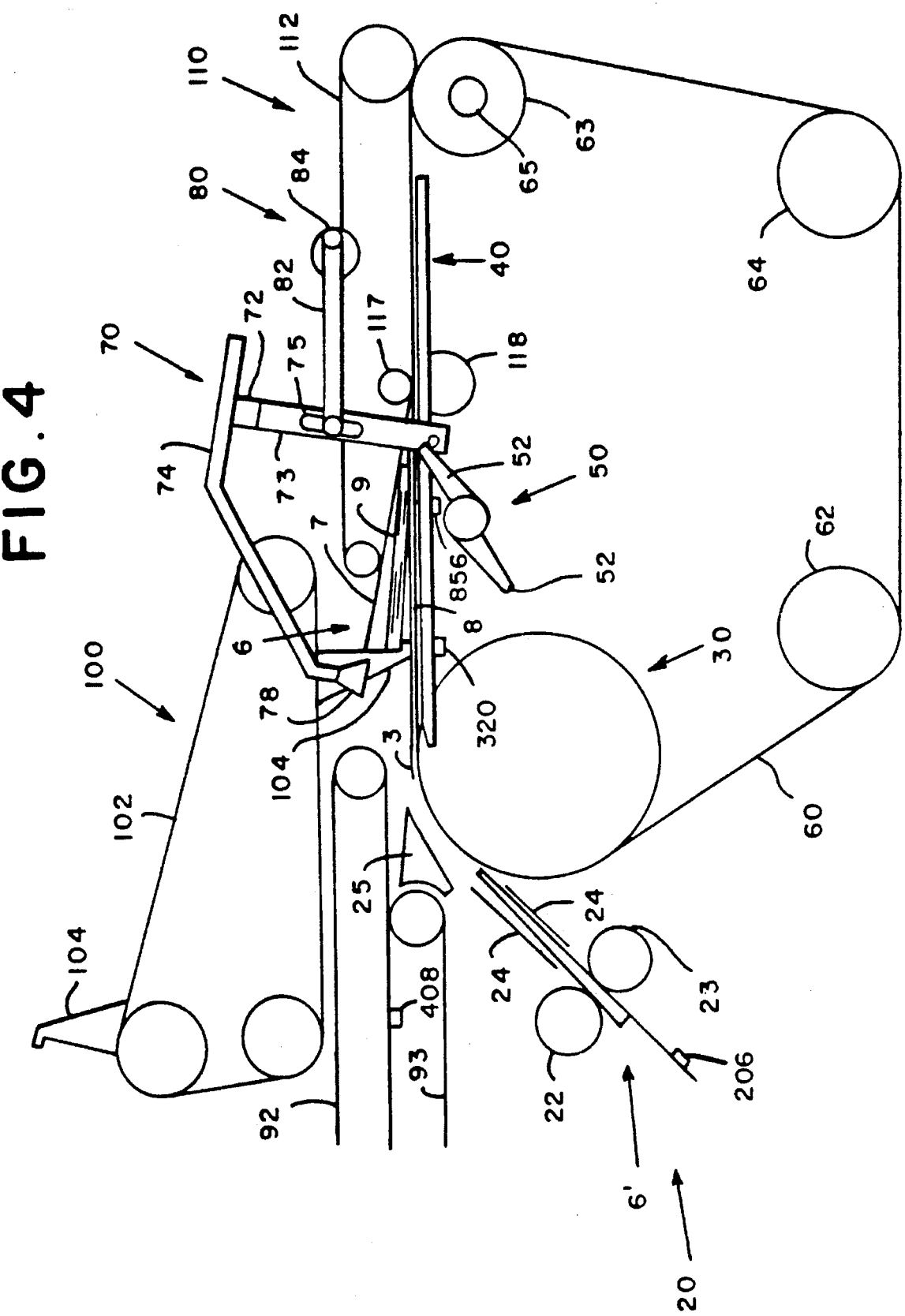
FIG. 4 is a schematic side elevation view of the apparatus of FIG. 1 which includes the output belt assembly.

The envelope inserting station further comprises a vacuum drum 30, which supplies a valved vacuum at its periphery by way of holes (not shown) straddled by a plurality of laterally spaced transport belts 60 which move about the periphery of the drum as well as pulleys 62, 63, and 64 (FIGS. 3 and 4).

Vacuum deck 40 has a horizontal surface adjacent to the top of the vacuum drum 30 which has grooves for guiding the transport belts 60 and apertures (not shown) respectively located between each pair of transport belts 60 through which members of backstop 50 may protrude.

Backstop 50 comprises a plurality of laterally-spaced "two-around" fingers 52 that when protruding above the surface will create a wall for stopping an incoming envelope. The fingers are fixed to a single axle 54 driven by a servo motor (not shown).

The vacuum or sucker bar assembly 70 includes a support bar 72 (FIG. 2) which spans the width of the vacuum deck and is rigidly secured at the ends to pivotable arms 73 which rotate concentrically about a pivot point 71. At various locations along the bar are clamped tubes 74 bent toward the deck and having a vacuum suction cup 78 at the end. As the bar assembly pivots, the vacuum cups move toward the deck 40 to where they can contact the back panel 7 of the envelope 6. In this position, the vacuum is valved "on" so that with the front panel held in place, the envelope opens as the vacuum cups 78 are rotated in the opposite direction.

As seen in FIGS. 3 and 4, link 82 attached to arm 73 extends back to a motor/crank assembly indicated at 80. Eccentric crank 84 is controlled by a servo motor (not shown) that drives the link 82. As the eccentric crank rotates, link 82 is driven back and forth to cause the vacuum bar assembly to rock forward and then backward to open the envelope.

Figure 1:
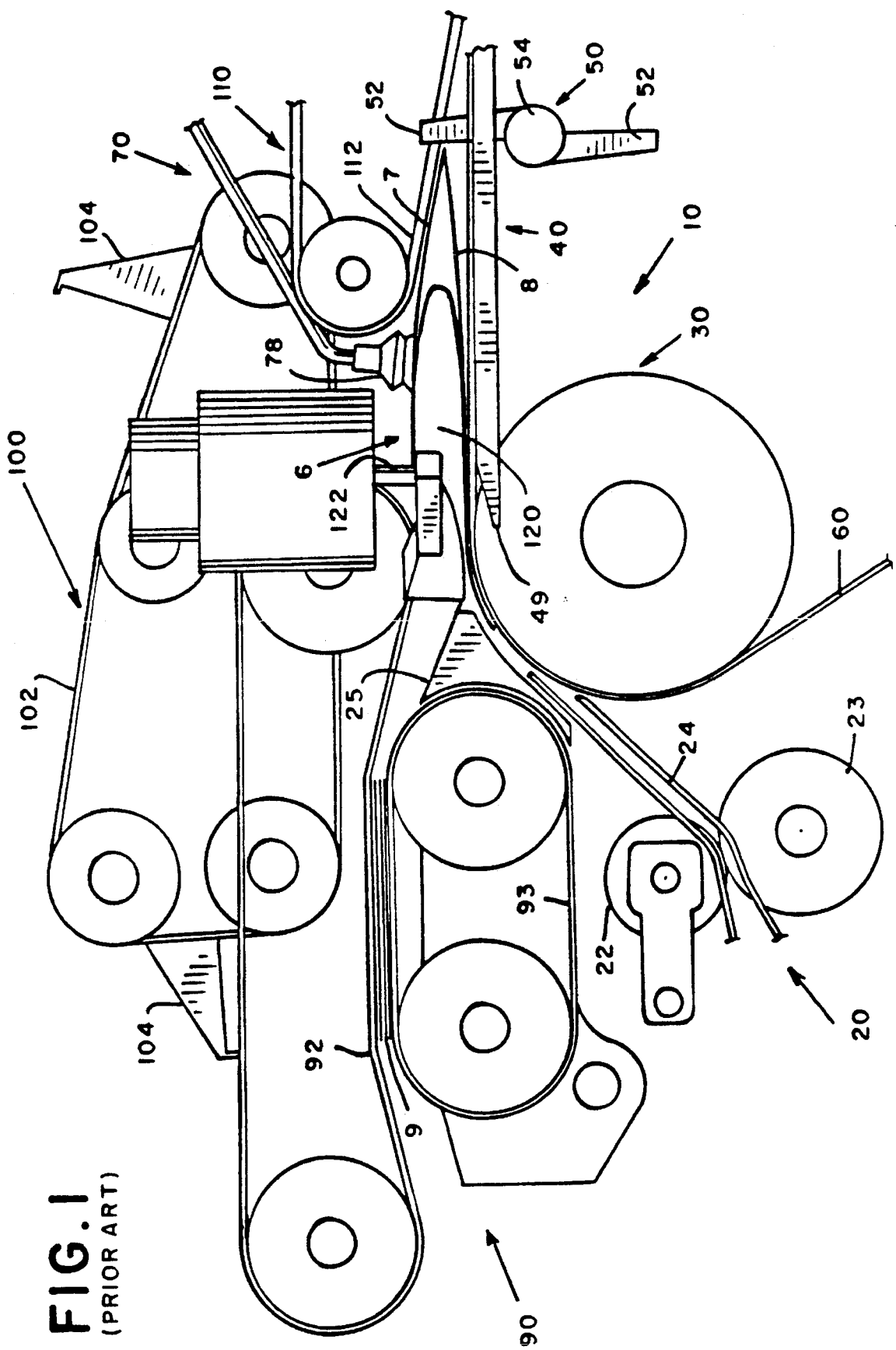
FIG. 1 is a side elevational schematic view of an envelope inserting apparatus in which an asynchronous control system in accordance with the invention may be utilized.
Figure 2:
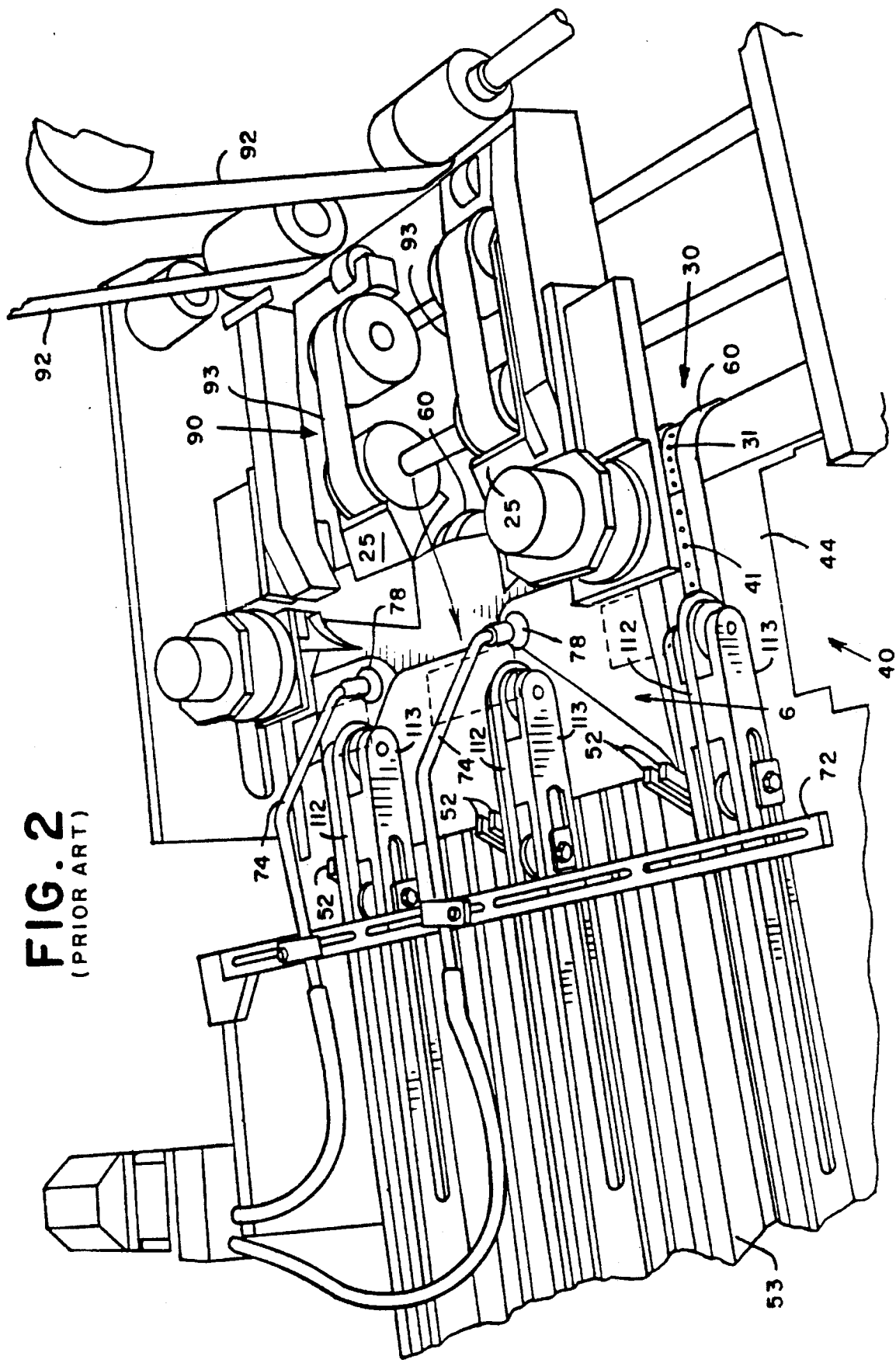
FIG. 2 is a perspective view of the inserting apparatus of FIG. 1 showing an envelope at the inserting station.

Dual belt transport 90 comprises two pairs of continuously moving, preferably elastic, transport belts 92 and 93 that accept and transport collations such as the one shown at 9 being conveyed from an upstream station (not shown). Overhead pusher assembly 100 comprises a plurality of laterally spaced belts 102, each belt having pusher fingers 104 located approximately 180 degrees apart around the periphery. These pusher fingers 104 are aligned to create a wall which pushes the collation 9 into the waiting envelope. In FIG. 2 the overhead pusher assembly 100 is shown pivoted into an open position for accessibility to the paper path.

As shown in FIG. 4, output belt assembly 110 extends from vertically above the insertion area to the most downstream portion of the insertion device 10. The output belt assembly 110 includes continuously running upper belts 112 which both interfere with the fingers 52 of the backstop 50 and mesh with the transport belts 60. Fingers 52 include a groove through which the lower reach of corresponding belts travel when the fingers 52 are in an upright position. As shown in FIG. 2, the interference by belts 112 with fingers 52 are obscured by belt support member 113. The interference of belts 112 and fingers 52 form a capture area from which the envelope cannot escape as it is driven to backstop 50. The meshing of upper belts 112 with the transport belts 60 provides a positively controlled output transport for filled envelopes as they exit the insertion area.

Returning to FIG. 1, a pair of funnel shaped guide fingers or horns 120 are supported from above the envelope path and are eccentrically mounted on shafts 122 so that they can be pivoted into a waiting envelope 6 to shape and support the edges of the envelope for ease of entry of the collation. Once the vacuum bar assembly 70 has begun the process of opening the envelope, the guide horns are pivoted into the open envelope and continue the pivoting motion until the edges of the envelope are shaped and supported by the horn profile. It will be understood that the guide horns 120 also serve to center the envelope 6 in the path of the oncoming collation 9. A more detailed description of the guide horns may be obtained from application Ser. No. 08/037842, now U.S. Pat. No. 5,247,780, specifically incorporated herein by reference.

The flap 3 of the envelope is maintained in the flapped condition by flap retainers 25 which in conjunction with the guide horns 120 and vacuum deck 40 maintain the lower envelope panel 8 and flap 3 in position to receive the collation.

Figure 5:
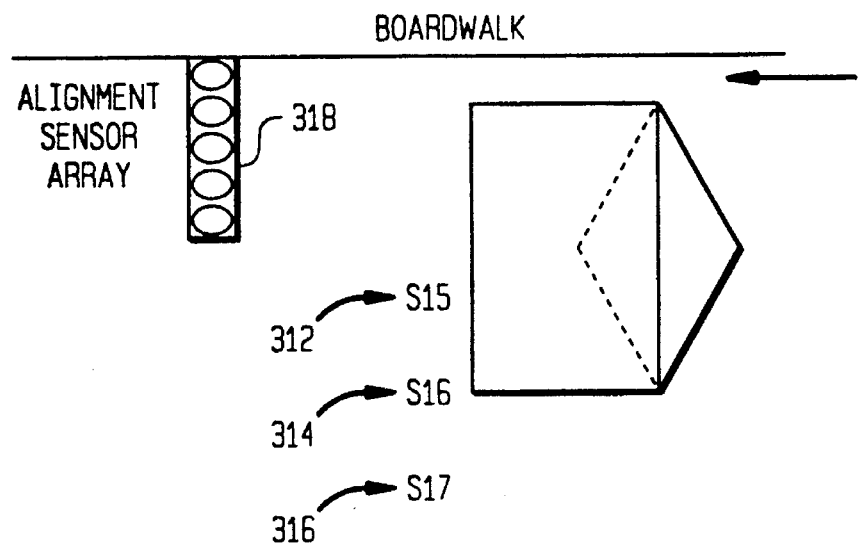
FIG. 5 is a schematic of the skew sensor array.

Sensors for the detection of the position of the envelope and the collation are disposed in the system at suitable points as will be discussed below. FIG. 5 shows one particular set of sensors S15 at 312, S16 at 314 and S17 at 316 which are arranged in conjunction with alignment sensors shown at 318 all generally shown on the deck 40 (FIGS. 3 and 4) to detect the passage and alignment of the envelope as it passes.

For use in conjunction with the invention herein described, closed-loop servo motors, commonly referred to as smart motors, such as the Sigmax II stepping motors manufactured by Pacific Scientific Motor and Control Division of Rockford, Ill., are used to drive the driven components of the the inserting station 10.

For further details of the operation of the illustrated insertion station, reference may be made to application Ser. No. 08/144,466, now U.S. Pat. No. 5,447,015, (Atty. Docket. E-117) assigned to the assignee of the instant application and specifically incorporated by reference herein. A suitable microcomputer and communication scheme for use with inserter devices is described in U.S. Pat. No. 5,003,485 to Francisco which is also specifically incorporated by reference herein.

Generally, the overall operation of the insertion device operating under control of the system control in accordance with the present invention is as follows. The rollers 22 and 23 of the envelope arming station 20 are stopped with an envelope (for purposes of this description envelope #1) in a known position. When a feed command is received, the arming station 20 waits for a predetermined period of time before feeding the envelope. This creates a specific gap between envelopes in the insertion area. When the desired gap is attained, the envelope #1 is fed to the constantly running transport belts 60. At the same time, another envelope (#2) can be fed to the known position at the arming station 20 and will remain there until the next feed command.

As the envelope #1 travels along the constantly running transport belts, the vacuum at vacuum drum 30 is actuated based on the envelope position. The vacuum provides positive drive for the envelope on the curved path. The vacuum can be turned off when the envelope travels past the drum. It will be appreciated that this travel distance is equal to the envelope depth.

As envelope #1 continues its travel on the continuously running transport belts 60, its lead edge crosses the sensor array 312 to 318 on the vacuum deck 40. The sensor crossing in conjunction with the user input for envelope depth triggers actuation of the sucker bar assembly 70. When the sucker bar assembly 70 has opened the envelope to a predetermined amount, the horns 120 rotate into the open envelope and upon completion of the rotation into the envelope, the envelope is prepared for insertion and will wait in this position for a collation to arrive. It will be appreciated that in one of the significant advantages of this asynchronous system in accordance with the invention, the envelope can wait in this position for an unlimited period of time or until a specified time-out condition is reached as desired.

As the collation enters the the insertion area, its trailing edge crosses a sensor which triggers the start of the motion of the overhead pusher 100. The pushers 104 meet the trailing edge of the collation and push it into the prepared envelope. The sucker bar assembly 70 releases the envelope in accordance with a specific predetermined pusher position and returns to its home position. At a different predetermined pusher position, the backstop 50 rotates away from the leading edge of the envelope to allow the stuffed envelope to exit. As the backstop 50 begins its rotation, a feed command is issued to the arming station 20 to feed envelope #2. It will be understood that the sequence continues for additional envelopes until a stop command is issued.

The backstop remains clear of the output path until the leading edge of the exiting envelope crosses a last sensor. The sensor crossing in conjunction with the envelope depth and the flap length triggers the return of the backdrop to its vertical position. The horns also return to the the recessed position where they are ready to pivot into the next envelope.

In accordance with the invention, each of the operations described above are computer-controlled by various software modules that will now be described.

Figure 6:
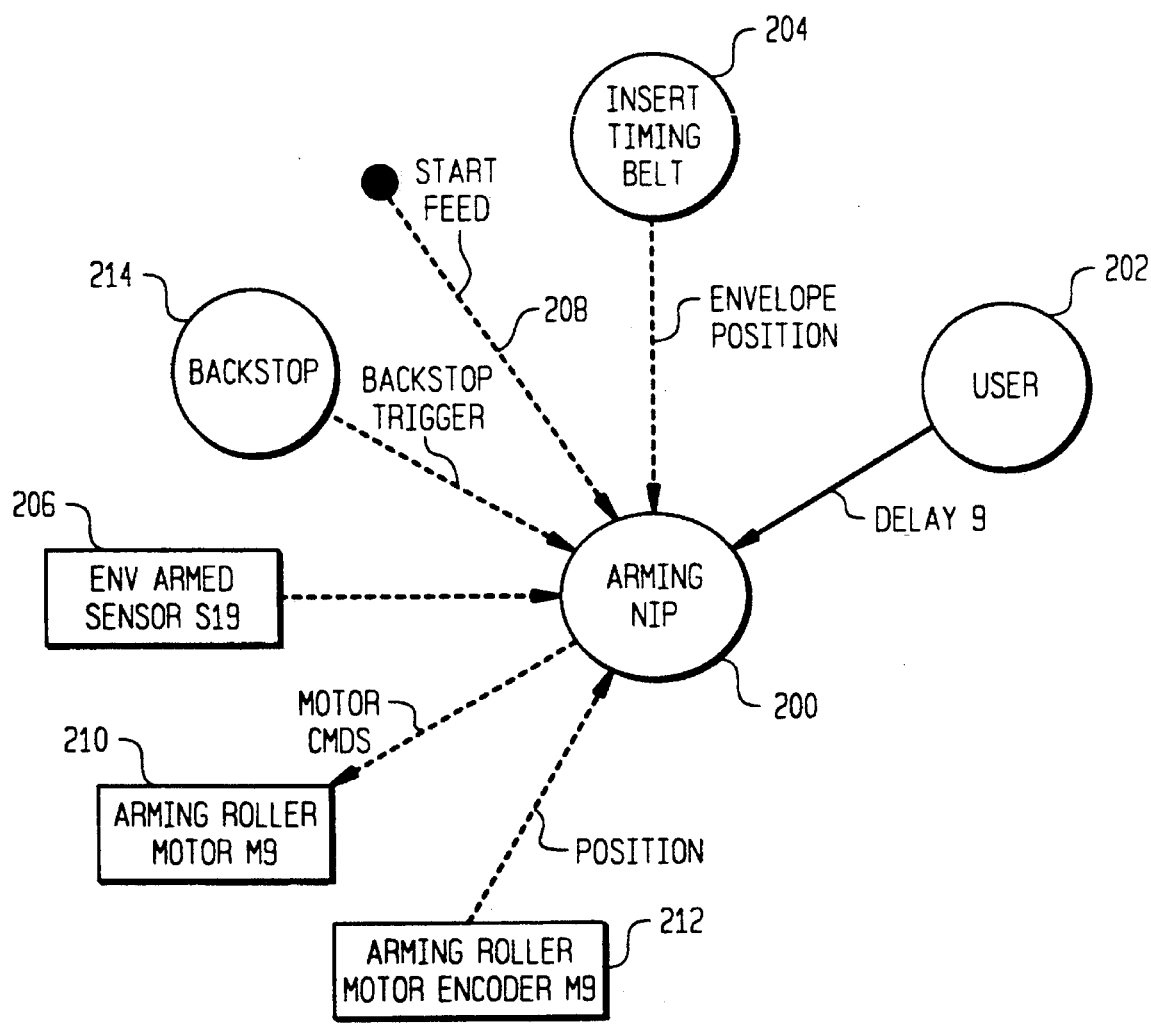
FIG. 6 illustrates the various inputs and outputs of the arming station software control module for beginning the process of preparing an envelope for receiving the collation.

FIG. 6 illustrates the various inputs and outputs of the arming station software control module 200 for beginning the process of preparing an envelope for receiving the collation. The arming station software program module indicated at 200 accesses user data such as envelope depth and the like input by the user as indicated at 202. In this and the following figures, solid lines indicate data flow while dashed lines will indicate control information.

Figure 7:
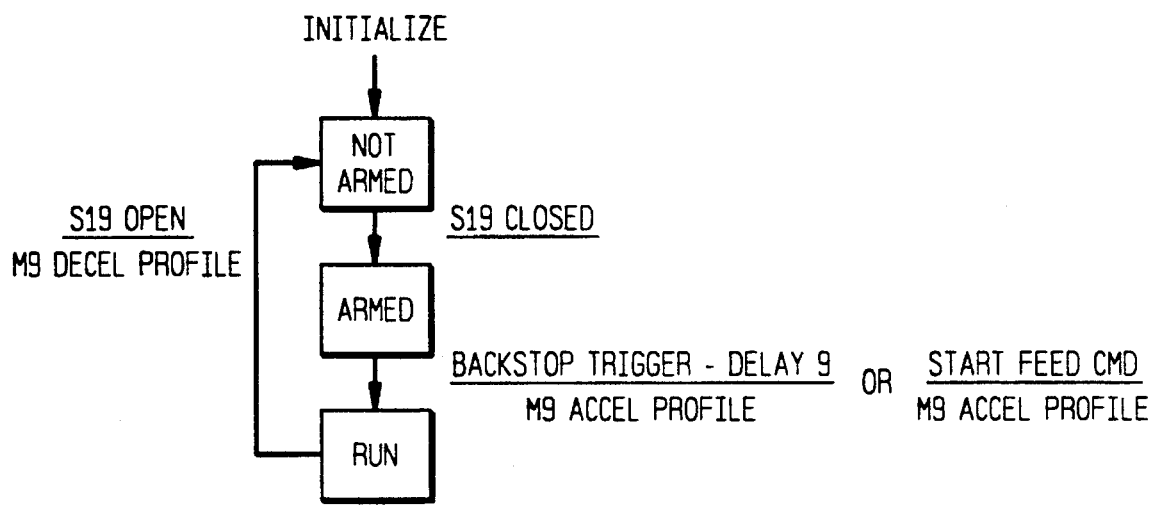
FIG. 7 is a flow chart of the operation of module of FIG. 6.

As seen in FIG. 6, additional information and sensor data is received from the insert timing belt at 204 from which the envelope position is derived. Sensor S19 at 206 shows the presence or absence of the envelope in the arming station. When an envelope feed request is received, 208, a motor profile is selected to command the motor M9, 210, in accordance with the selected profile typically after a delay as previously brought out to create the proper gap. Motor position information is provided by encoder E9, 212, in conventional manner. On receipt of a signal from sensor 206 that the envelope has cleared, a deceleration motor profile is selected and the module then waits for the backstop trigger at 214 to arm the next envelope. The operating states of this module at the arming station are Not Armed, Armed, or Run, and for the sensor 206 Open (no envelope) or Closed (envelope). FIG. 7 is a flow chart of the operation of module 200.

Figure 8:
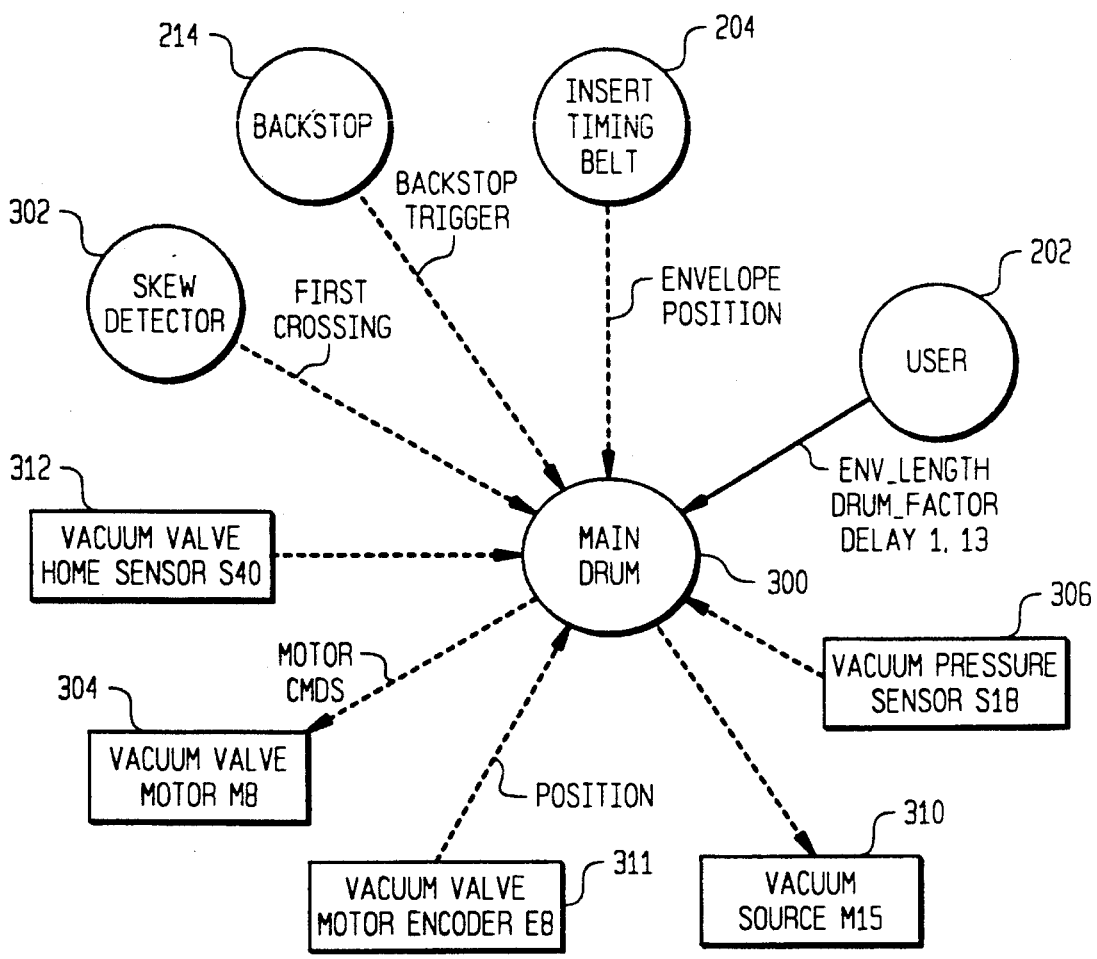
FIG. 8 illustrates the main drum software program module.

As shown in FIG. 8, the main drum software program module 300 also receives the user information from the user 202 along with the position information from the insert timing belt at 204 as well as the detection of a first crossing by the skew detector module 302. The vacuum valve position may be controlled via software commands to motor M8, at 304, based on information from sensors S18, 306, and S18, at 308, for controlling a vacuum source generated by operation of motor M15 (310) with position information supplied by encoder E8 at 311. Alternatively, the valve may simply be controlled by mechanical linkages in correspondence with the position of the drum itself. A valve home position signal is provided at 312. The motor 310 preferably runs constantly while the sensors signal the state of the vacuum valve and the presence or absence of pressure. FIG. 9 is an illustrative flow chart of the operation of the module of FIG. 8.

Figure 10:
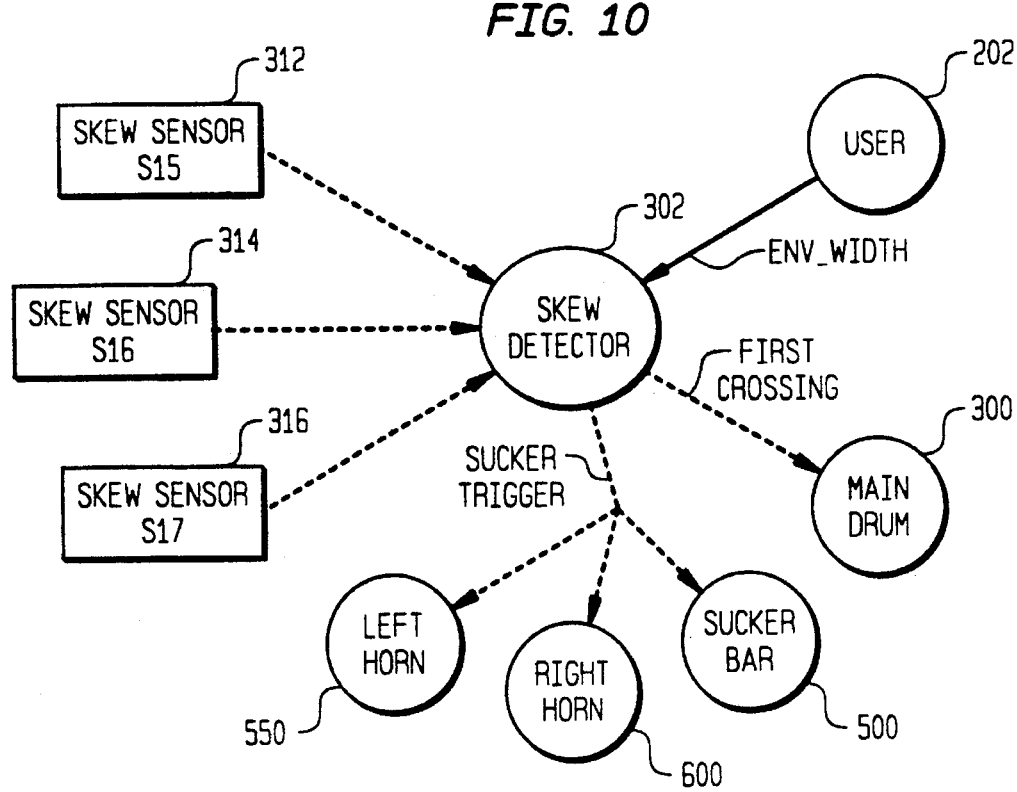
FIG. 10 illustrates the input and output of the skew detector module.

FIG. 10 illustrates the input and output of the skew detector module 302. User information and particularly the envelope width is supplied by user 202 which along with the sensing of the envelope at sensors S15 at 312, S16 at 314, and S17 at 316 are used to signal the first crossing to the main drum module 300 and provide a trigger signal to the sucker bar assembly 70 and horns 120 if the amount of skew is determined to be within an acceptable range. FIG. 11 is a flow chart of the operation of the module 302. Envelope location and alignment operation is also determined by the information from the alignment sensor array at 318.

Figure 12:
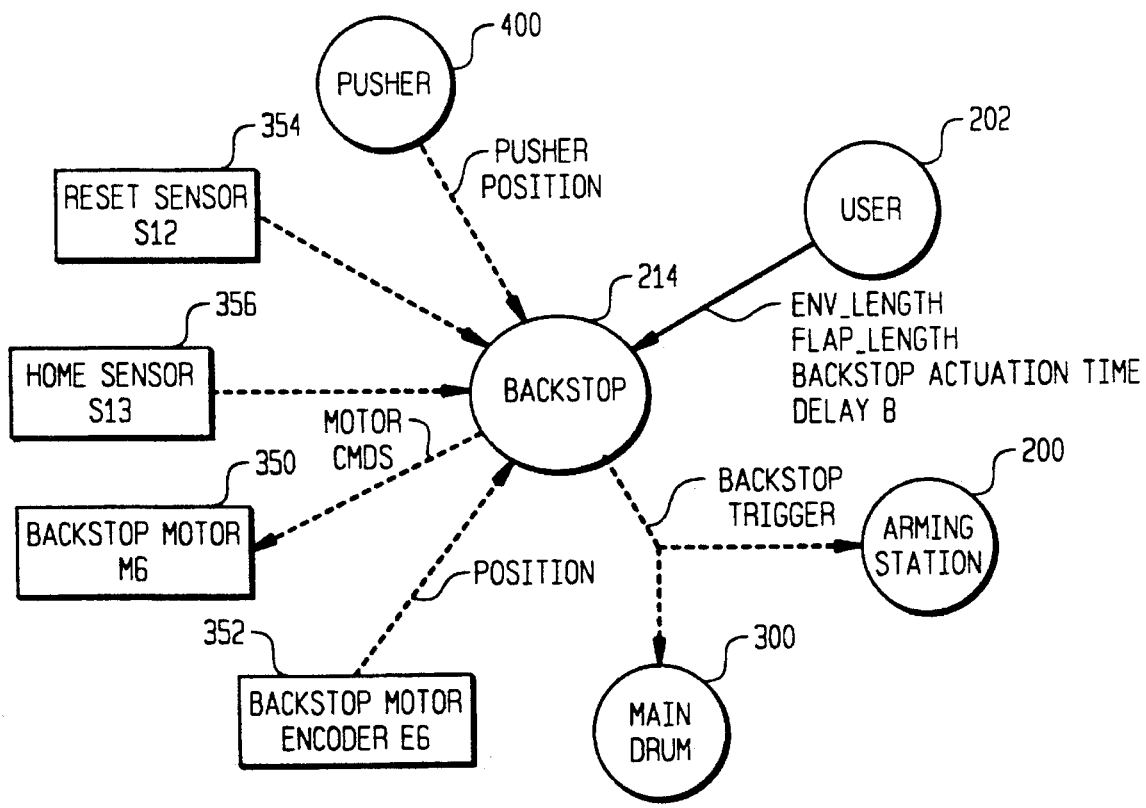
FIG. 12 illustrates the backstop software program module.

FIG. 12 illustrates that the backstop software program module 214 receives information from the user 202 as well as pusher position information from pusher module 400 and provides commands in accordance with a selected profile to the backstop motor M6, shown at 350, with feedback information provided by encoder E6 at 352 for operation of the backstop 50. Reset sensor S12 at 354 and Home sensor S13 at 356 detect the presence or absence of the envelope at the backstop. As the backstop begins to rotate away, a backstop trigger signal is provided to the Arming station module 200 and to the Main drum module 300 for feeding the next envelope. FIG. 13 is a flow chart of the operation of the module of FIG. 12.

Figure 14:
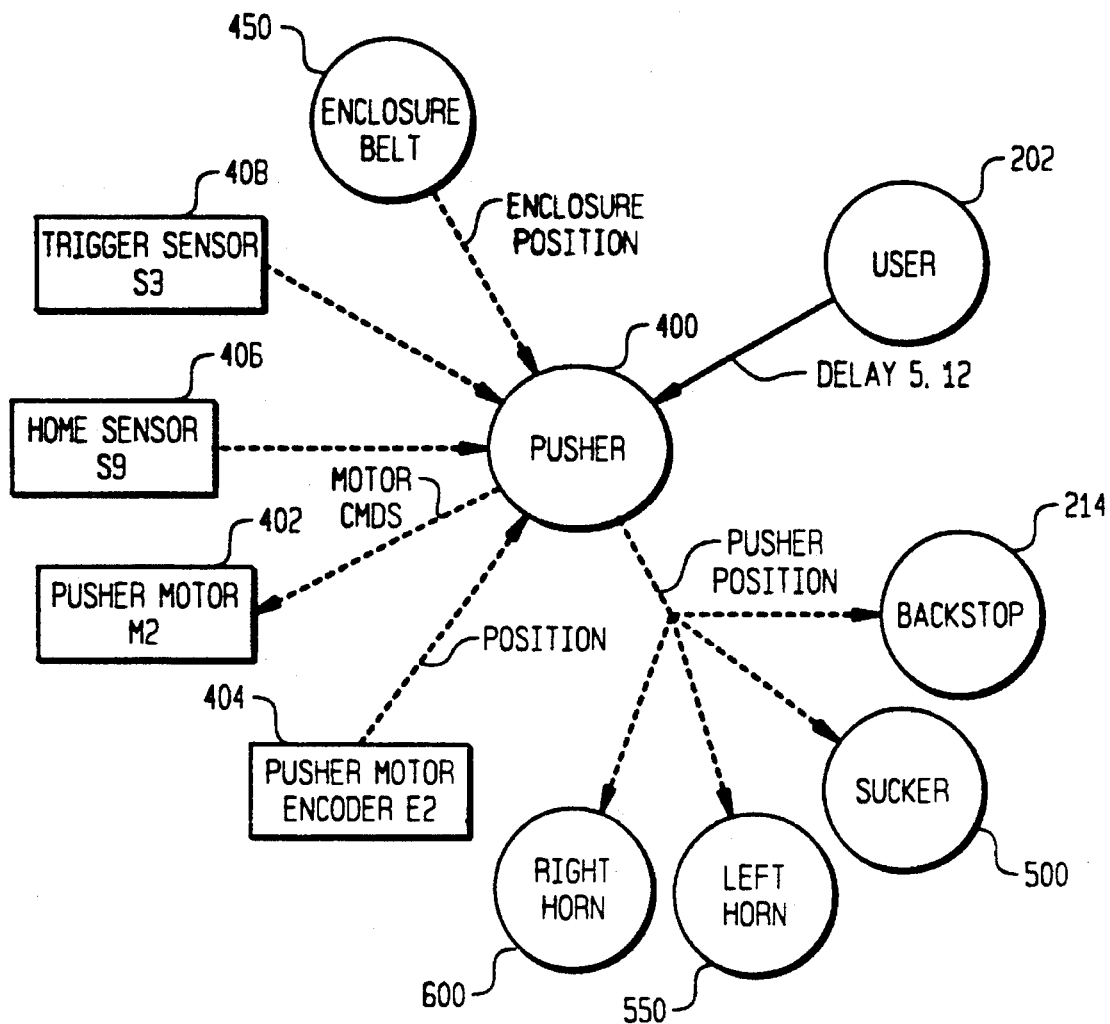
FIG. 14 shows the pusher module which controls the operation of the pusher assembly.

FIG. 14 shows pusher module 400 which controls the operation of pusher assembly 100. The module 400 receives user information from the user 202 as well as enclosure (collation) position information from enclosure belt module 450. Pusher motor M2 at 402 which drives the pusher assembly 100 receives motor commands based on predetermined motor profiles selected at module 400 while the motor position is provided by encoder E2 at 404. Pusher assembly position information is provided to the backstop module 214, sucker module 500, left horn module 550 and right horn module 600. Home sensor S9 at 406 detects the home position of the assembly while trigger sensor S3 at 408 is used to determine the presence of an enclosure or collation package. FIG. 15 is a flow chart of the operation of this module.

Figure 16:
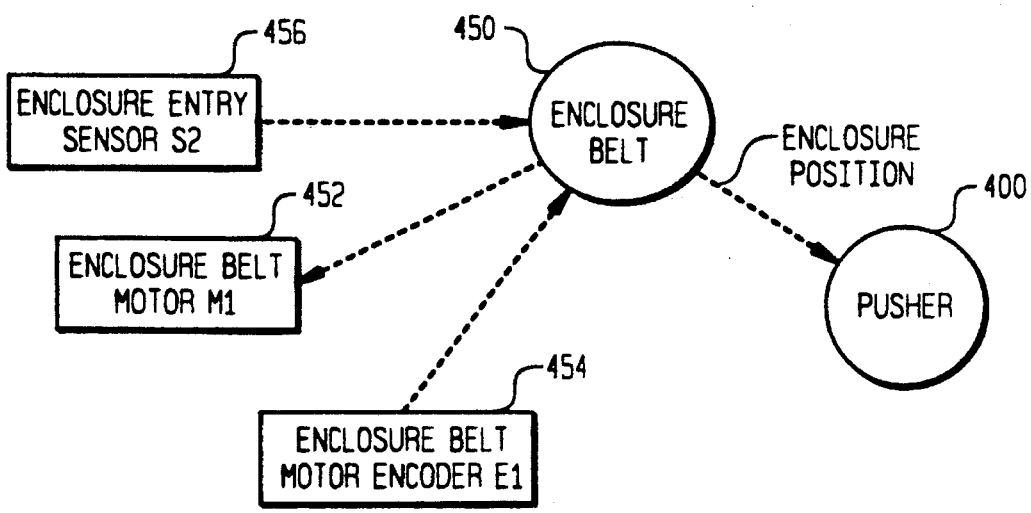
FIG. 16 shows the enclosure belt program module.

FIG. 16 shows the enclosure belt program module 450. The enclosure belt module 450 selects the desired motor profile for driving the motor M1 at 452 and receives encoder information for determining motor position from encoder E1 at 454. Enclosure sensor S2 at 456 detects the presence or absence of the enclosure at an appropriate entry point. The module outputs enclosure position information to the Pusher Module 400 as brought out above.

FIG. 17 illustrates the Sucker bar software program module 500. This module receives user information as indicated from the user 202 as well as position information from both the pusher module 400 and the insert timing belt module 204. The signal from the skew detector module 302 provides a trigger for initializing the operation of the sucker bar assembly 70. Module 500 drives motor M5 at 502 using selected profiles and receives position feedback information from encoder E5 at 504. Home sensor S10 at 505 detects the home position of the bar assembly. Vacuum source motor M17 at 506 operates under the control of module 500 while vacuum pressure sensor S11 at 508 detects the presence of the vacuum. FIG. 18 is a flow chart of the operation of module 500.

Figure 19:
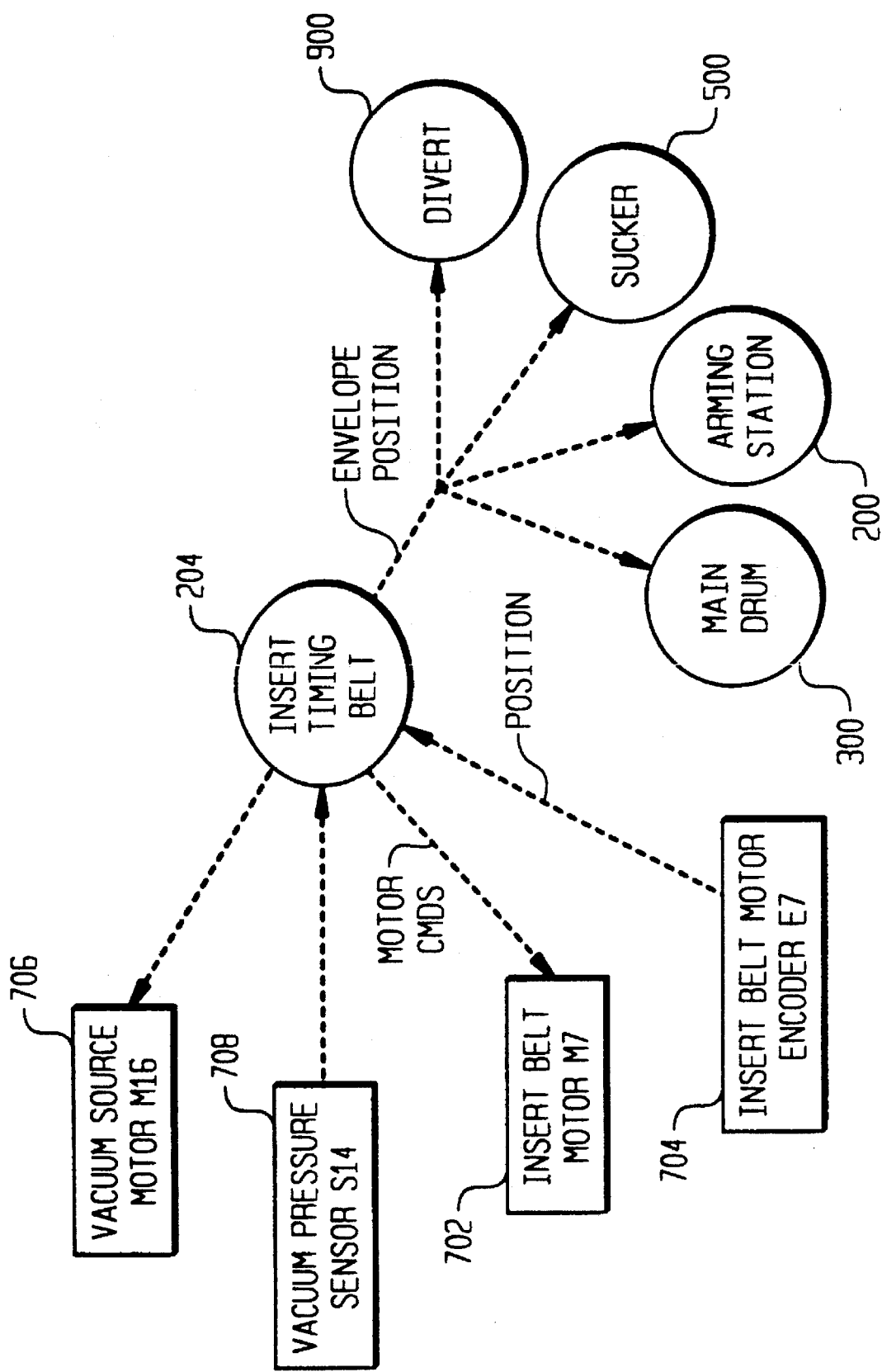
FIG. 19 shows the insert timing belt module which controls the insert belt drive.

FIG. 19 shows the insert timing belt module 204 which controls the insert belt drive via motor M7 at 702 and receives motor position information from encoder E7 at 704. Module 700 also controls the vacuum source motor M16 at 706 and receives the sensor information from vacuum sensor S14 illustrated at 708. Envelope position control information is output to the main drum module 300, the arming station module 200, the sucker module 500 and the divert module 900.

Figure 20:
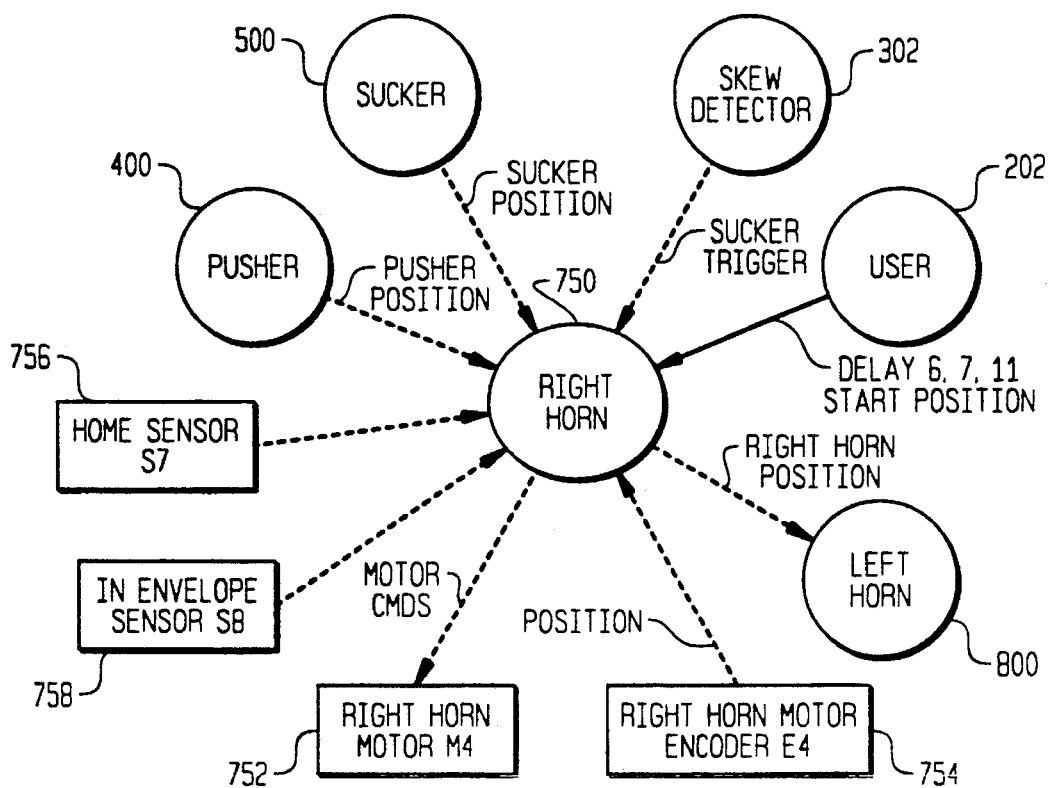
FIGS. 20 and 21 show the modules for control of the right and left horns, respectively.
Figure 21:
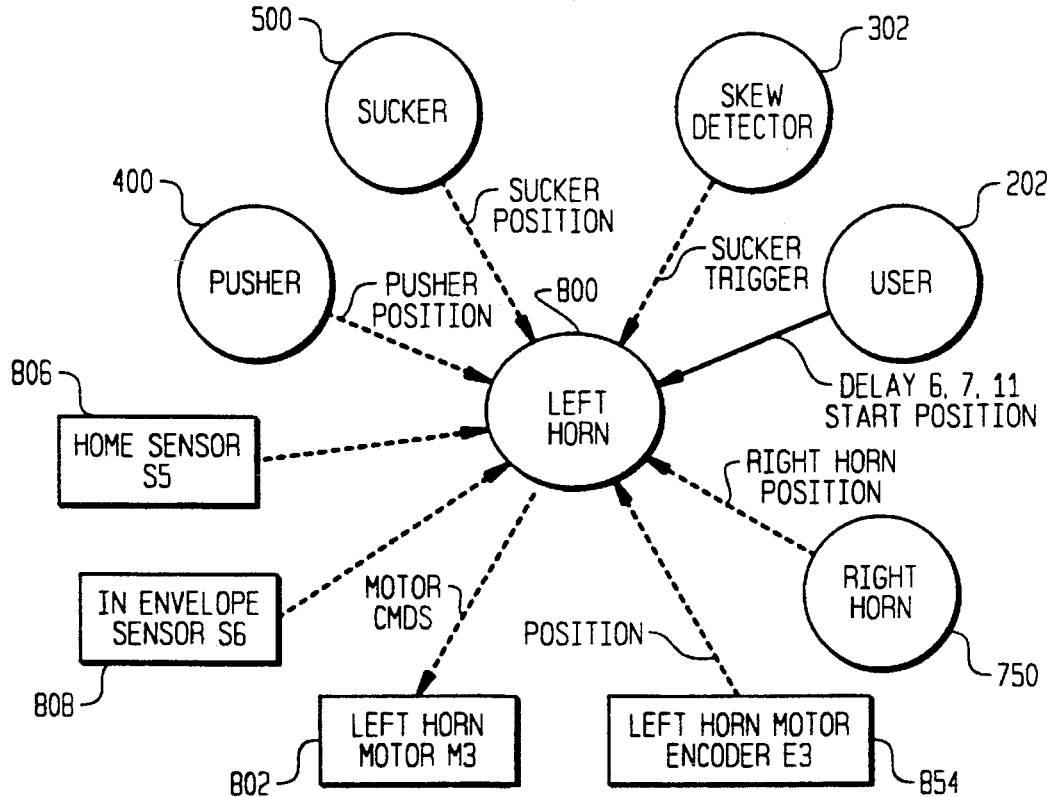

FIGS. 20 and 21 show the modules 750 and 800 for control of the right and left horns, respectively. Each module receives information from the user 202 and control information and signals from the skew detector module 302, sucker module 500, and pusher module 400. The right horn module 750 provides position information to the left horn module 800. Module 750 provides drive information to the motor M4 at 752 and receives position information back from encoder E4 at 754. Home sensor S7 at 756 detects the home location of the right horn and S8 shown at 758 senses whether the horn is in the envelope. In similar fashion left horn module 800 provides drive information to the left horn motor M3 at 802 and receives feedback position information from encoder E3 shown at 804. Home sensor S5 at 806 detects the home position of the horn and S6 at 808 senses if the left horn is in the envelope. FIGS. 22 and 23 are the respective flow charts for modules 750 and 800 for controlling the operation of the horns 120.

Figure 24:
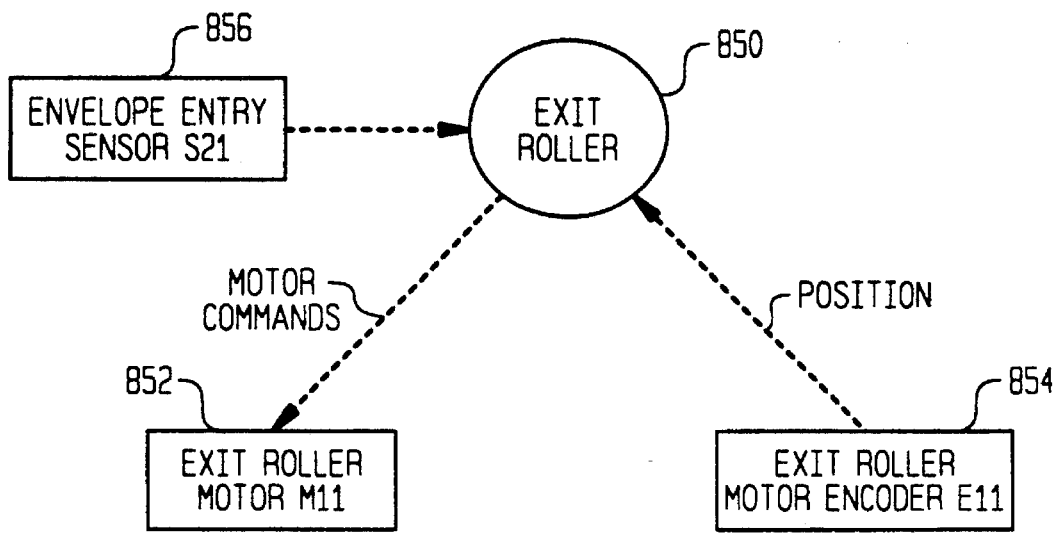
FIG. 24 illustrates the exit roller software module.

The exit roller software module shown at 850 in FIG. 24 drives exit roller motor M11 at 852 and receives motor position information from encoder E11 at 854. Entry sensor S21 at 856 detects the presence of an envelope in the exit path.

Figure 25:
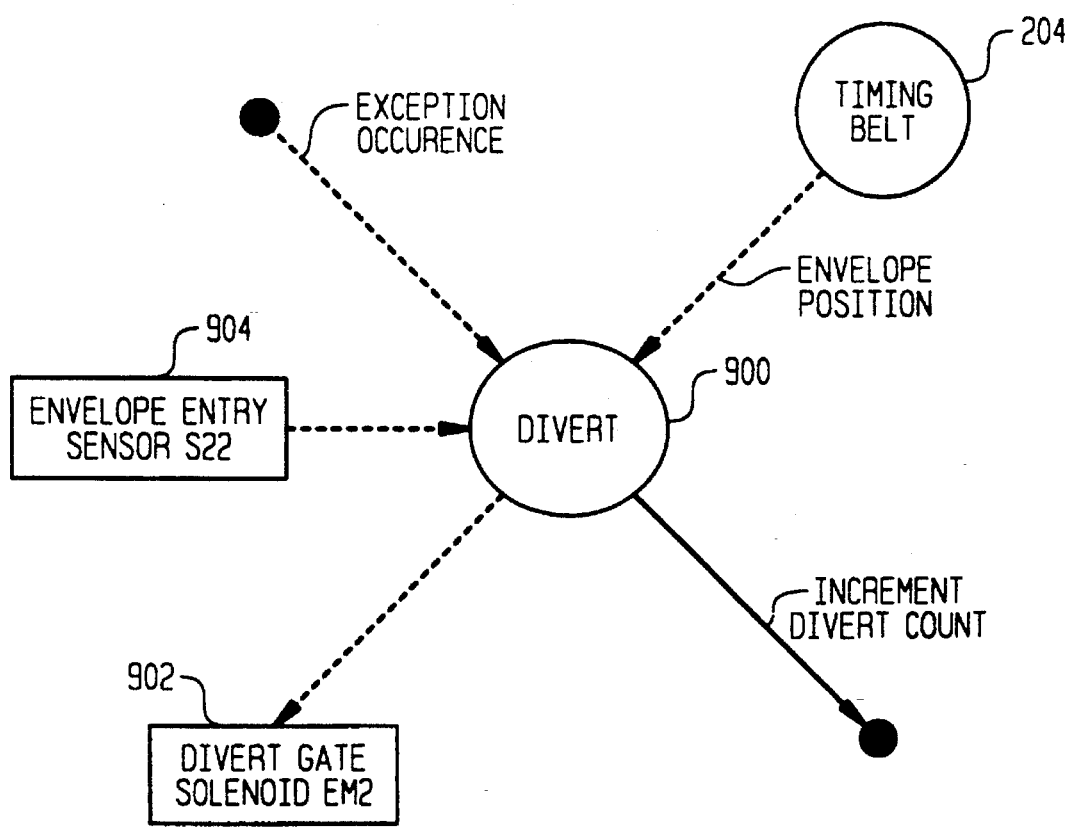
FIG. 25 illustrates the inputs and outputs of the divert module.

FIG. 25 illustrates the inputs and outputs of the divert module 900. A significant advantage of the control in accordance with the invention is that the envelope may be efficiently diverted if a problem is detected. That is there is no need to drive the envelope in synchronization with a particular insert so that the envelope may be simply ejected and another transported to the receiving position if required. The envelope position is received from the timing belt module 204. An exception occurrence input is received and a divert gate solenoid 902 is actuated. Envelope entry sensor S22 shown at 904 provides envelope entry control sensing while data is provided to increment the count of items diverted.

Figure 26A:
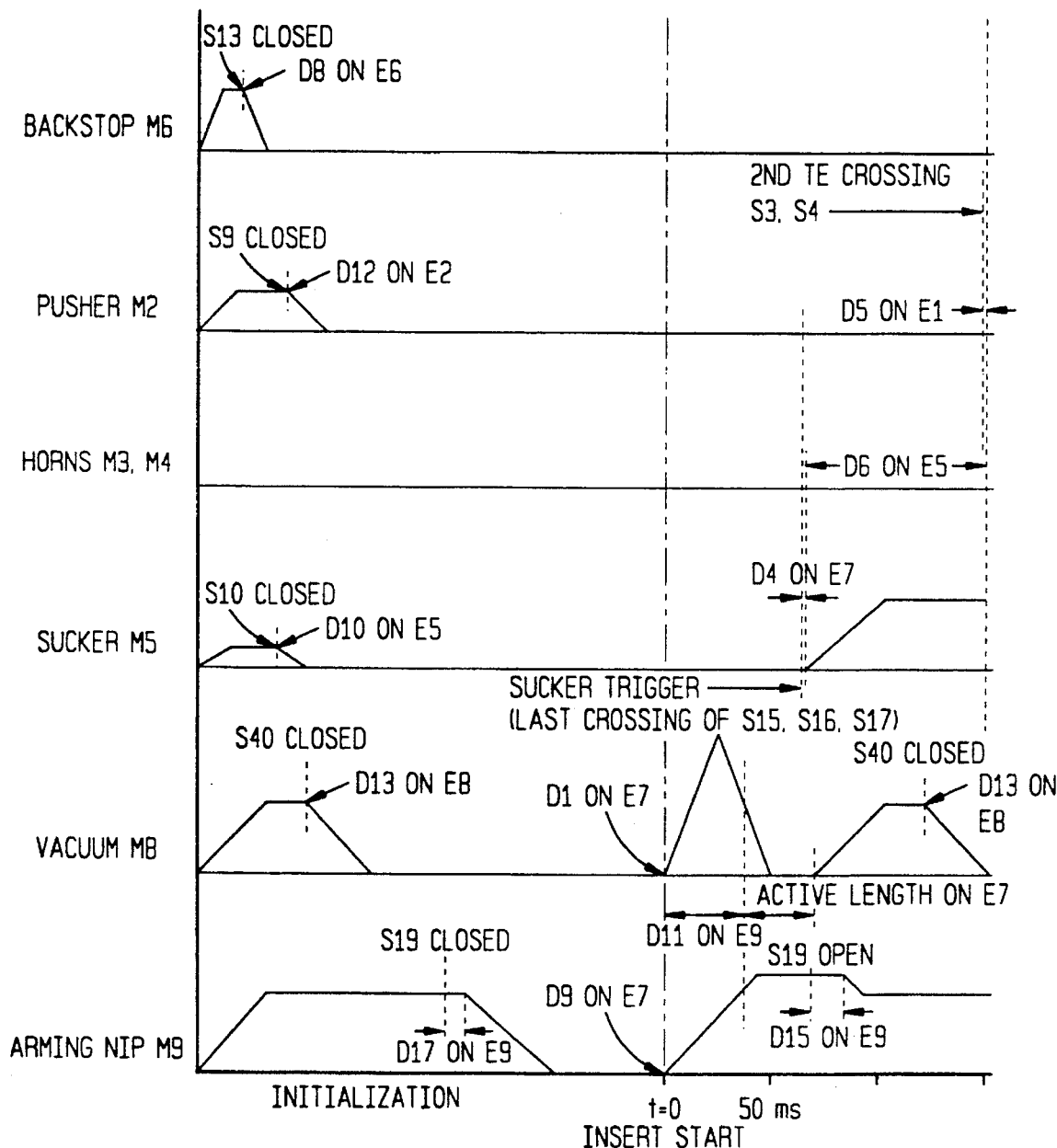
FIG. 26a and 26b comprise a timing diagram of the operating sequence of the various motors controlled by the software modules.
Figure 26B:
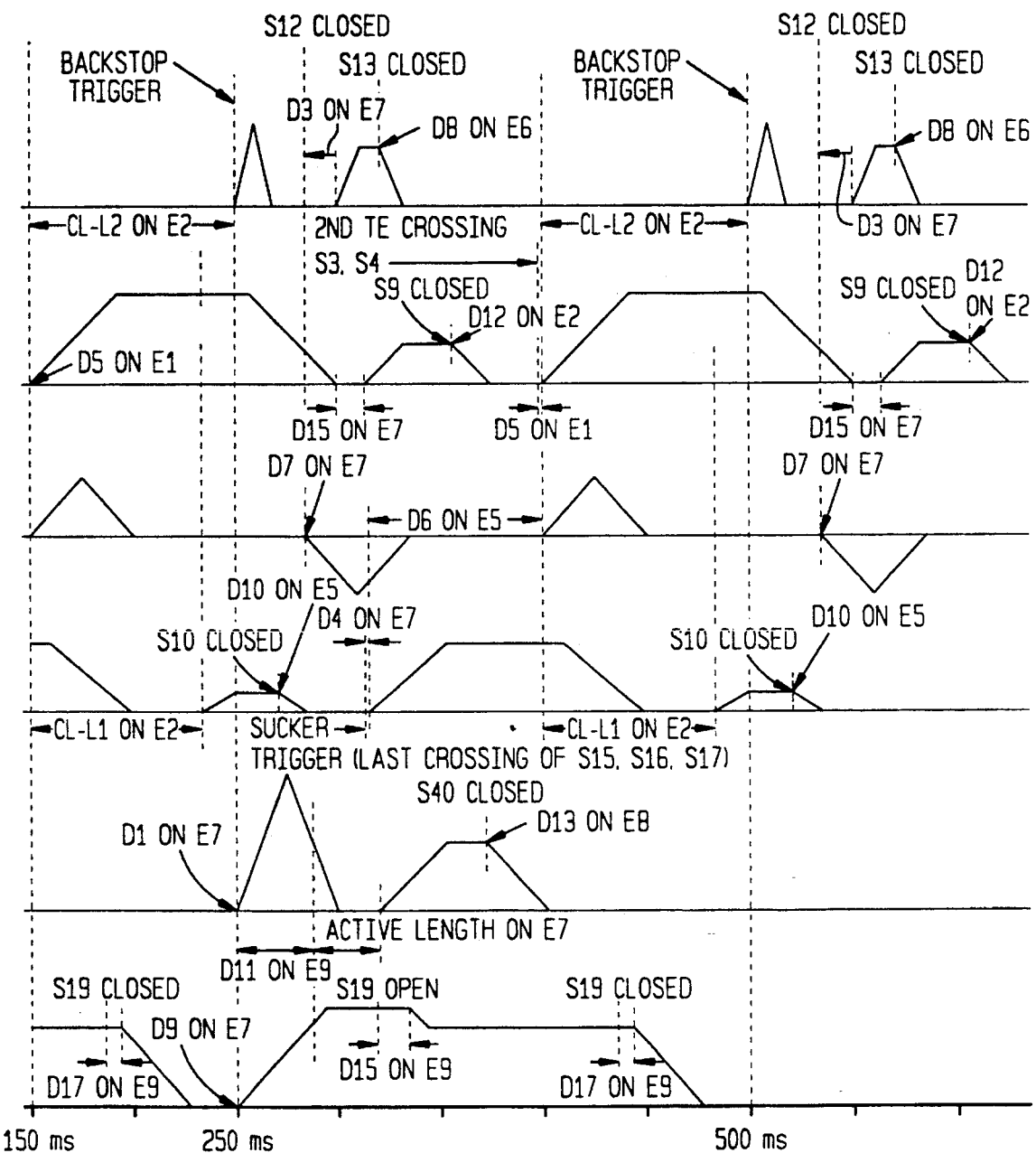

FIGS. 26a and 26b comprise a timing diagram of the operating sequence of the various motors controlled by the software modules which shows in one place a typical timing of the sequence of operation in accordance with the invention. Since it is believed that the diagram is self-explanatory to those skilled in the art there is no need for detailed explanation of the various operating sequences which have been discussed in conjunction with the previous figures and therefore these discussions will not be reiterated here.

Figure 27:
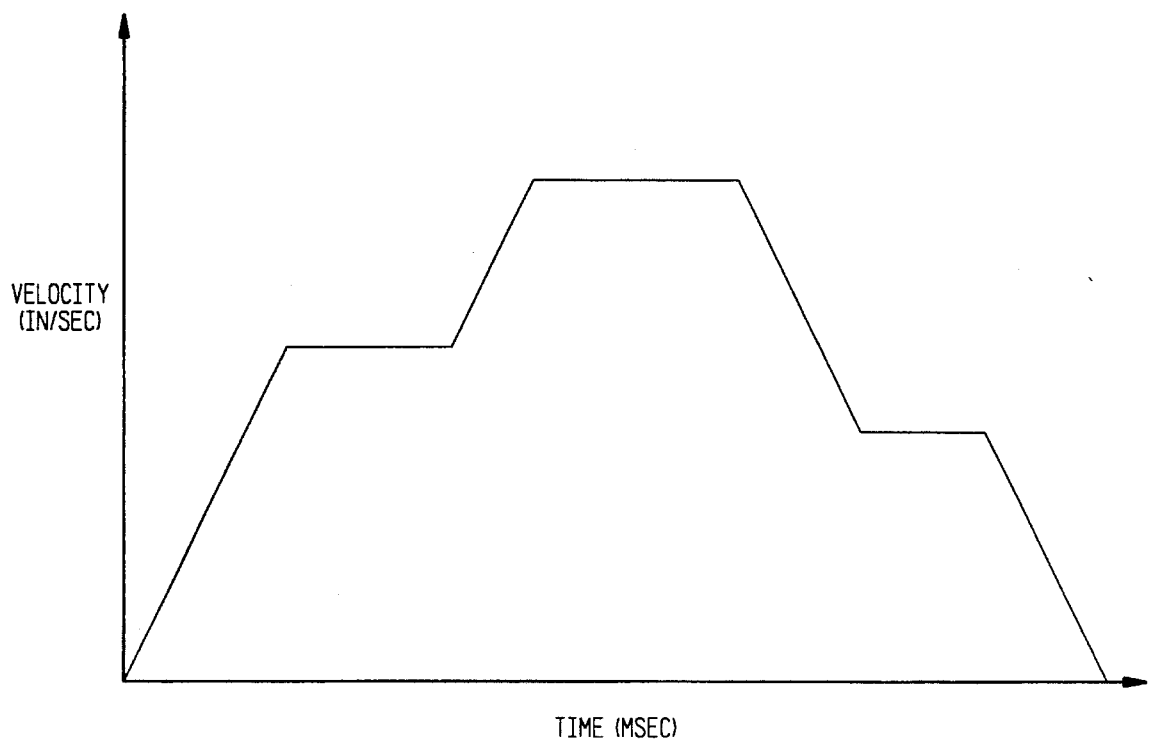
FIG. 27 is a typical motion profile for an operation.

In accordance with the present invention, the various required motion profiles are implemented by describing a motion (acceleration, deceleration, constant velocity, and step) using a set of eight (8) two (2)-byte numbers. FIG. 27 illustrates a typical motion profile for an operation. The basic formula, $x=x_o+v_o t+(\frac{1}{2})\alpha t^2$ describes the distance covered at any point of the motion. This principle is used to convert linear accelerations and velocities into units of encoder position at any point in time for use by a servo loop.

Figure 28:
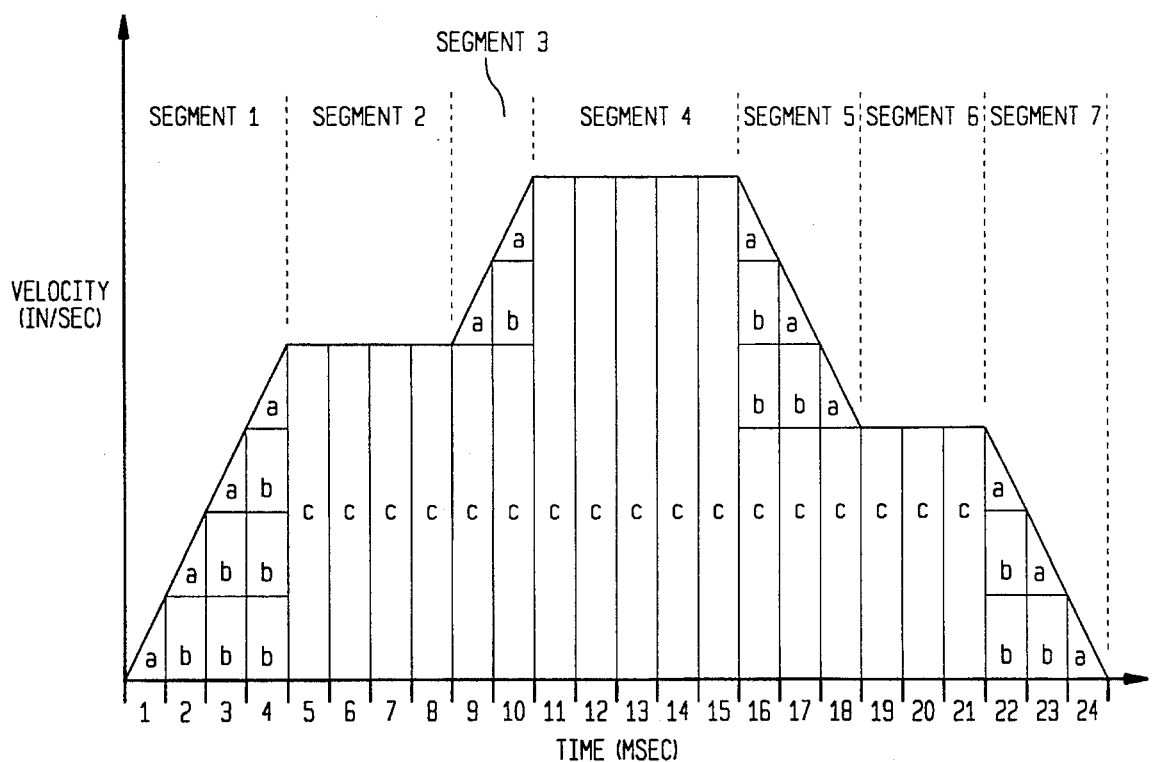
FIG. 28 shows the profile of FIG. 27 broken into segments for illustrating the various calculations in accordance with the invention.

FIG. 28 illustrates how the motion profile of FIG. 27 can be broken into servo time in a plurality of segments. For example, the position at time T=1 msec is simply the area of triangle a. At time T=2 msec, the position is $2a+b$. It will be understood that the term $2a+b$ is the distance and is thus related to the expected encoder information at time T=2 msec. In order to calculate the numbers a and b, the formulas $$v=\alpha t \text{ and } x=x_o+v_o t+(\frac{1}{2})\alpha t^2$$

are used.

For best results, acceleration and time are adjusted by rounding to the nearest millisecond so that since
$v=\alpha t$, then $t_{adj}=v/\alpha$ and thereupon $t_{adj}$ is rounded to the nearest millisecond. The constant $\alpha$ is then recomputed by setting $\alpha_{adj}=v/t_{adj}$ so that the velocity v is correctly achieved.

The parameters a and b can now be computed in terms of encoder clicks. While not to be taken to be a limitation, in a typical encoder, there are for example 1600 encoder clicks per motor revolution and thus, depending on the particular design arrangement, when the motor turns $\delta$ revolutions, the mechanism moves one-inch. Using this information,
b=v inches/sec*(0.001 sec)*(1600 clicks/rev)*$\delta$rev/inch
As seen by inspection of FIG. 28, b=2a since a is one half the area of the rectangle b.

As also seen from FIG. 28, the area covered during every millisecond of the acceleration is equal to c, so that in segment three of the profile, the acceleration is the same as in segment one except that there is an initial velocity. So, c=$v_o$inches/sec*(0.001 sec)*(1600 clicks/rev)*$\delta$rev/inch
The position can now be computed from any acceleration and any starting velocity. The resultant equation is
E(n)=(n)(a+c)+(n−1)(b)+E(0)
where E(0) is the encoder position at T=0 msec.

Figure 29A:
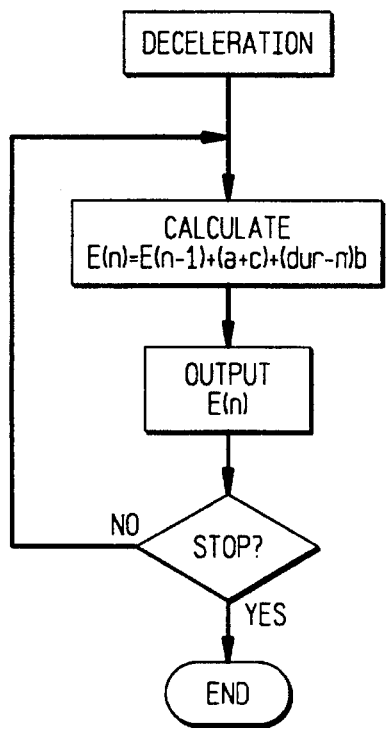
FIGS. 29a and 29b illustrate flow charts of the calculation in accordance with the invention.
Figure 29B:
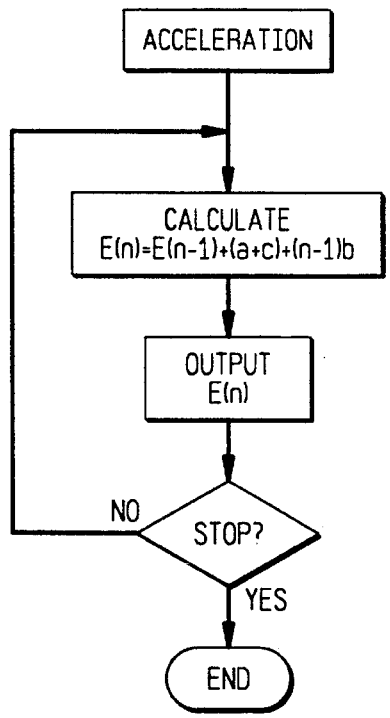

In the case of a constant velocity as in segment two, a and b are 0 and E(n)=n(c)+E(0). Decelerations are simply a special case of acceleration, so that as illustrated in FIG. 29a, a deceleration profile segment is calculated using
E(n)=E(n−1)+(a+c)+(dur−n)b
where dur=duration of deceleration in msecs.

It may also be noted that the acceleration equation may be restated in terms of the previous encoder position to define the profile for acceleration calculations shown in the flow chart of 29b
E(n)=E(n−1)+(a+c)+(n−1)b with a,b=0 for constant velocity segments.

Figure 30:
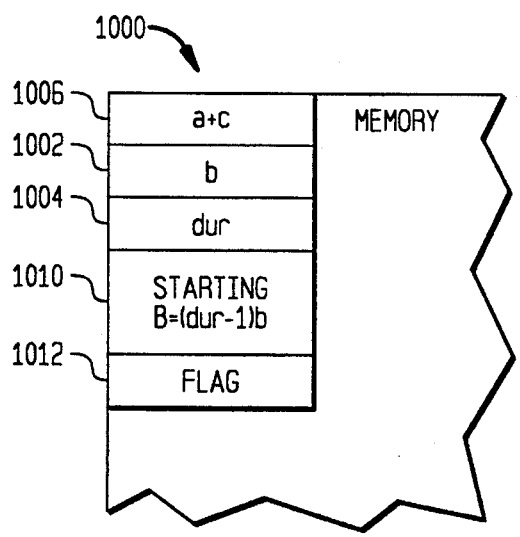
FIG. 30 shows a memory allocation in accordance with the invention.

Thus the numbers which must be furnished and stored in fields in memory 1000 as shown in FIG. 30 for the microprocessor calculation for each segment are a, b (at 1002) and c with durations (seen at 1004) added for the deceleration cases. For best results and in order to avoid the step of adding a and c, the number a+c (at 1006) may be stored.

Figure 31:
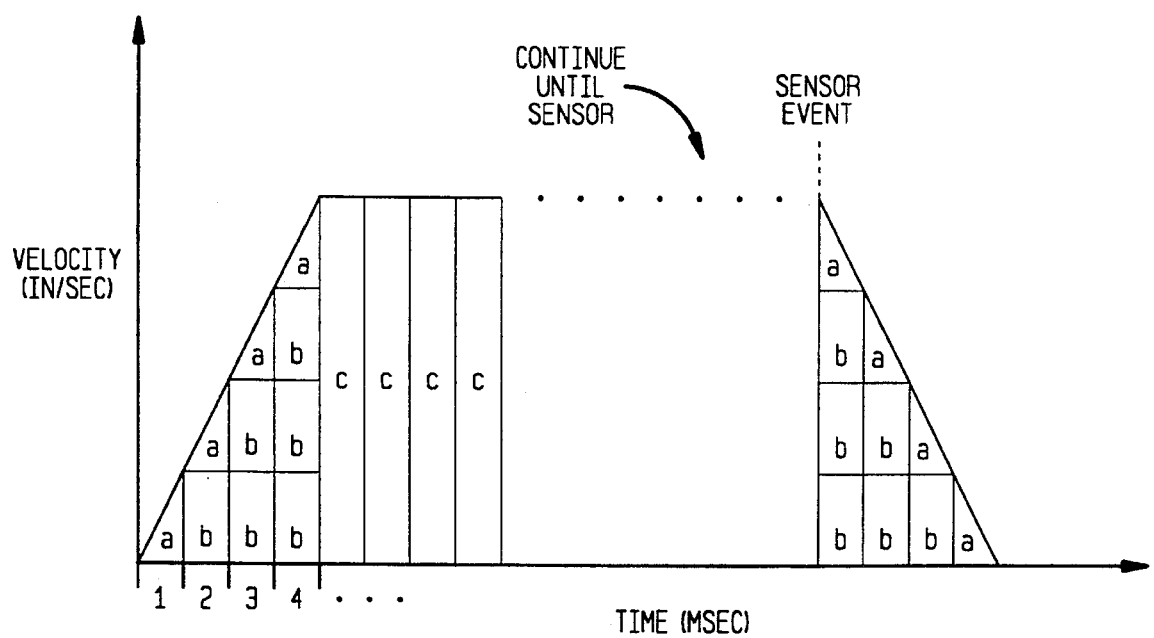
FIG. 31 shows a variation of a profile in which a determined motion proceeds until a command is received to change the segment.

A significant advantage accrues in that if motions are desired until a determined time or an event has occurred as illustrated in FIG. 31, the duration can be set to =−1 and the microprocessor controller will continue until a command is received to change the segment. It will also be appreciated that if a step is desired, that is to go to position x as fast as possible, the duration is set equal to 1 and a or c is set to be the distance in encoder clicks with b=0. Thus a or c=step size in inches*$\delta$rev/inch*600clicks/rev. With the profile thus described, the servo loop will cause the motor to achieve and hold the position in as short a time as possible.

Returning now to FIG. 30, if a microprocessor without floating point capabilities is used, the numbers (except for duration) may be broken into an integer and fractional portion. Also for best results, another parameter, Starting B for deceleration segments may be stored at 1010. Starting B=(dur−1)b so that the microprocessor is not required to do any expensive multiplications up front. This number also can be broken into integer and fractional portions.

Preferably, another 2-byte quantity, a flags field 1012 is provided so that the motion controller can determine the type of segment on which it is operating.

What is claimed is:

1. A method for providing motion information for a motor controller for a motor having an encoder for providing motor feedback data, the method comprising the steps of:
   (a) converting a conventional distance formula means into at least one incremental encoder position formula means;
   (b) determining a set of motion parameters for the encoder position formula means for a plurality of linear segments of a motion profile;
   (c) storing the set of motion parameters;
   (d) determining motor drive information using the set of motion parameters and the encoder position formula means for control of the motor during operation of the motor; and
   (e) driving the motor in accordance with the determined information.

2. The method of claim 1 wherein the motion is a deceleration and the determination is made in terms of the previous encoder position using the formula $$E(n)=E(n-1)+(a+c)+(dur-n)b$$

where a, b, and c are stored motion parameters and dur is duration of deceleration in msecs.

3. The method of claim 2 wherein dur is set equal to a negative one (−1) to indicate a constant velocity of undetermined length and further comprising the step of driving the motor in accordance with the encoder position formula means and providing an event signal for commanding a change at a determined event.

4. The method of claim 1 wherein the motion is an acceleration and the determination is made in terms of the previous encoder position using the formula $$E(n)=E(n-1)+(a+c)+(n-1)b$$

where a, b, and c are stored motion parameters and wherein a,b=0 for constant velocity segments.

5. The method of claim 1 further comprising the step of storing a flag for indicating the type of segment being determined.

6. The method of claim 1 wherein steps a, b and c are performed prior to controlling the motor and steps d and e are performed during control of the motor.

* * * * *

UNITED STATES PATENT AND TRADEMARK OFFICE
CERTIFICATE OF CORRECTION

PATENT NO : 5,552,691
DATED : September 3, 1996
INVENTOR(S): Perry A. Pierce, et al.

It is certified that error appears in the above-identified patent and that said Letters Patent is hereby corrected as shown below:

Column 8, line 62, change "inches*$\sigma$ rev/inch*600clicks/rev." to inches*$\sigma$ rev/inch*1600clicks/rev.

Signed and Sealed this

Seventeenth Day of June, 1997

Attest:

BRUCE LEHMAN

Attesting Officer    Commissioner of Patents and Trademarks